(12) United States Patent
Bharghavan

(10) Patent No.: US 9,197,482 B1
(45) Date of Patent: Nov. 24, 2015

(54) OPTIMIZING QUALITY OF SERVICE IN WIRELESS NETWORKS

(75) Inventor: Vaduvur Bharghavan, Morgan Hill, CA (US)

(73) Assignee: Meru Networks, Sunnyvale, CA (US)

( * ) Notice: Subject to any disclaimer, the term of this patent is extended or adjusted under 35 U.S.C. 154(b) by 661 days.

(21) Appl. No.: 12/976,717

(22) Filed: Dec. 22, 2010

Related U.S. Application Data

(60) Provisional application No. 61/290,830, filed on Dec. 29, 2009.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 29/06* | (2006.01) |

(52) U.S. Cl.
CPC .............................. *H04L 29/06523* (2013.01)

(58) Field of Classification Search
USPC .................................................. 370/230, 235
See application file for complete search history.

(56) References Cited

U.S. PATENT DOCUMENTS

| | | | |
|---|---|---|---|
| 3,956,749 A | 5/1976 | Magorian | |
| 5,038,151 A | 8/1991 | Kaminski | |
| 5,125,108 A | 6/1992 | Talwar | |
| 5,177,788 A | 1/1993 | Schanning et al. | |
| 5,337,397 A | 8/1994 | Lebby et al. | |
| 5,519,706 A | 5/1996 | Bantz et al. | |
| 5,884,272 A | 3/1999 | Walker et al. | |
| 5,966,094 A | 10/1999 | Ward et al. | |
| 6,023,621 A | 2/2000 | Jackson et al. | |
| 6,252,950 B1 | 6/2001 | Duty et al. | |
| 6,557,112 B1 | 4/2003 | Shimada | |
| 6,658,047 B1 | 12/2003 | Komulainen et al. | |
| 6,728,603 B2 | 4/2004 | Pruzan et al. | |

(Continued)

FOREIGN PATENT DOCUMENTS

| | | |
|---|---|---|
| JP | 2005311580 | 11/2005 |
| JP | 2006229972 | 8/2006 |

OTHER PUBLICATIONS

Amir. "Fast Handoff for Seamless Wireless Mesh Networks." MobiSys '06, Jun. 19-22, 2006, pp. 83-95, ACM, Uppsala, Sweden.

(Continued)

*Primary Examiner* — Noel Beharry
*Assistant Examiner* — Farhad Ali
(74) *Attorney, Agent, or Firm* — Law Office of Dorian Cartwright

(57) ABSTRACT

An AP having a message waiting time that provides proper QoS while losing minimal communication bandwidth, setting parameters for each level of QoS in response to a measure of the degree of contention for that level of QoS, and in response to a measure of the degree of contention for those levels of QoS with higher priority, and setting waiting time parameters in response to a stochastic model of contention at each level of QoS. Changes in contention at each level of QoS affect the AP's waiting time parameters for that level of QoS and also for levels of QoS with lower priority. Operational parameters might include contention window time, AIFS time, and back-off value(s), and might be modified in response to message QoS.

8 Claims, 3 Drawing Sheets

(56) References Cited

U.S. PATENT DOCUMENTS

| | | |
|---|---|---|
| 6,760,318 B1 | 7/2004 | Bims |
| 6,788,658 B1 | 9/2004 | Bims |
| 6,839,038 B2 | 1/2005 | Weinstein |
| 6,877,043 B2 | 4/2005 | Mallory et al. |
| 6,894,649 B2 | 5/2005 | Ostervall |
| 6,933,909 B2 | 8/2005 | Theobold |
| 6,950,629 B2 | 9/2005 | Nagy |
| 6,954,177 B2 | 10/2005 | Channabasappa et al. |
| 6,978,158 B2 | 12/2005 | Ghavami |
| 6,999,802 B2 | 2/2006 | Kim |
| 7,171,215 B2 | 1/2007 | Khouaja et al. |
| 7,194,008 B2 | 3/2007 | Chu et al. |
| 7,197,308 B2 | 3/2007 | Singhal et al. |
| 7,277,728 B1 | 10/2007 | Kauhanen |
| 7,319,685 B2 | 1/2008 | Kim et al. |
| 7,333,455 B1 | 2/2008 | Bolt et al. |
| 7,359,362 B2 | 4/2008 | King et al. |
| 7,400,604 B2 | 7/2008 | Lee et al. |
| 7,403,506 B2 | 7/2008 | Lee et al. |
| 7,406,319 B2 | 7/2008 | Kostic et al. |
| 7,420,942 B2 | 9/2008 | Wang |
| 7,426,388 B1 | 9/2008 | Wright et al. |
| 7,430,397 B2 | 9/2008 | Suda et al. |
| 7,433,722 B2 | 10/2008 | Sakamoto et al. |
| 7,466,981 B1 | 12/2008 | Abdelmahid et al. |
| 7,515,909 B2 | 4/2009 | Jain et al. |
| 7,555,287 B1 | 6/2009 | Heinonen et al. |
| 7,620,988 B1 | 11/2009 | Hernacki |
| 7,630,402 B2 | 12/2009 | Un et al. |
| 7,693,513 B2 | 4/2010 | Chou |
| 7,826,426 B1 | 11/2010 | Bharghavan et al. |
| 7,843,910 B2 | 11/2010 | Loughran et al. |
| 8,027,637 B1 | 9/2011 | Bims |
| 8,090,374 B2 | 1/2012 | Rezvani et al. |
| 8,472,359 B2 | 6/2013 | Bharghavan et al. |
| 2002/0022483 A1 | 2/2002 | Thompson et al. |
| 2002/0060995 A1 | 5/2002 | Cervello et al. |
| 2002/0086640 A1 | 7/2002 | Belcher et al. |
| 2002/0110085 A1* | 8/2002 | Ho et al. ............... 370/230 |
| 2002/0112008 A1 | 8/2002 | Christenson et al. |
| 2002/0131404 A1 | 9/2002 | Mehta et al. |
| 2002/0147031 A1 | 10/2002 | Hood |
| 2002/0181629 A1 | 12/2002 | Shibata |
| 2003/0065809 A1 | 4/2003 | Byron |
| 2003/0097595 A1 | 5/2003 | Partridge et al. |
| 2003/0162546 A1 | 8/2003 | Jordan |
| 2003/0198305 A1 | 10/2003 | Taylor et al. |
| 2003/0199247 A1 | 10/2003 | Striemer |
| 2003/0206532 A1 | 11/2003 | Shpak |
| 2003/0206535 A1 | 11/2003 | Shpak |
| 2003/0207697 A1 | 11/2003 | Shpak |
| 2003/0207698 A1 | 11/2003 | Shpak |
| 2003/0207699 A1 | 11/2003 | Shpak |
| 2003/0236103 A1 | 12/2003 | Tamaki et al. |
| 2004/0051668 A1 | 3/2004 | Chang |
| 2004/0063455 A1 | 4/2004 | Eran et al. |
| 2004/0105434 A1 | 6/2004 | Baw |
| 2004/0121770 A1 | 6/2004 | Tigerstedt et al. |
| 2004/0141617 A1 | 7/2004 | Volpano |
| 2004/0156399 A1 | 8/2004 | Eran |
| 2004/0183726 A1 | 9/2004 | Theobold |
| 2004/0185904 A1 | 9/2004 | Yamakita |
| 2004/0235453 A1 | 11/2004 | Chen et al. |
| 2005/0054370 A1 | 3/2005 | Shpak |
| 2005/0111405 A1 | 5/2005 | Kanterakis |
| 2005/0122919 A1 | 6/2005 | Touag |
| 2005/0135321 A1 | 6/2005 | Sharony |
| 2005/0152314 A1 | 7/2005 | Sun et al. |
| 2005/0153713 A1 | 7/2005 | Sharony |
| 2005/0156794 A1 | 7/2005 | Theobold et al. |
| 2005/0156799 A1 | 7/2005 | Theobold |
| 2005/0195110 A1 | 9/2005 | Lin et al. |
| 2005/0219143 A1 | 10/2005 | Schadler et al. |
| 2005/0220048 A1 | 10/2005 | Lee et al. |
| 2005/0238054 A1 | 10/2005 | Sharma |
| 2006/0002331 A1 | 1/2006 | Bhagwat et al. |
| 2006/0007914 A1 | 1/2006 | Chandra et al. |
| 2006/0025127 A1 | 2/2006 | Cromer et al. |
| 2006/0049987 A1 | 3/2006 | Herrick |
| 2006/0056443 A1 | 3/2006 | Tao et al. |
| 2006/0098613 A1 | 5/2006 | Kish et al. |
| 2006/0111112 A1 | 5/2006 | Maveddat |
| 2006/0132360 A1 | 6/2006 | Caimi et al. |
| 2006/0215691 A1 | 9/2006 | Kobayashi et al. |
| 2006/0221993 A1 | 10/2006 | Liao et al. |
| 2006/0281500 A1 | 12/2006 | Huang et al. |
| 2007/0011317 A1 | 1/2007 | Brandyburg et al. |
| 2007/0014267 A1 | 1/2007 | Lam et al. |
| 2007/0091805 A1 | 4/2007 | Ramprashad et al. |
| 2007/0117514 A1 | 5/2007 | Gainey et al. |
| 2007/0121596 A1 | 5/2007 | Kurapati et al. |
| 2007/0165610 A1* | 7/2007 | Tseng et al. ............... 370/356 |
| 2007/0213071 A1 | 9/2007 | Hwang |
| 2007/0238438 A1 | 10/2007 | Alon et al. |
| 2008/0014956 A1* | 1/2008 | Balasubramanian ...... 455/452.1 |
| 2008/0080414 A1 | 4/2008 | Thubert et al. |
| 2008/0102835 A1 | 5/2008 | Zhao et al. |
| 2008/0112373 A1 | 5/2008 | Shpak |
| 2008/0153497 A1 | 6/2008 | Kalhan |
| 2008/0165866 A1 | 7/2008 | Teo et al. |
| 2008/0212535 A1 | 9/2008 | Karaoguz et al. |
| 2008/0242305 A1 | 10/2008 | Kahlert et al. |
| 2008/0261602 A1 | 10/2008 | Livneh |
| 2008/0287130 A1 | 11/2008 | Laroia et al. |
| 2009/0022127 A1 | 1/2009 | Traynor et al. |
| 2009/0023434 A1 | 1/2009 | Trainor et al. |
| 2009/0061873 A1 | 3/2009 | Bao et al. |
| 2009/0061879 A9 | 3/2009 | Gallagher et al. |
| 2009/0111472 A1 | 4/2009 | Promenzio |
| 2010/0080151 A1 | 4/2010 | Proctor et al. |
| 2010/0182929 A1 | 7/2010 | Abraham et al. |
| 2011/0075613 A1 | 3/2011 | Yuan |
| 2013/0010655 A1 | 1/2013 | Ho |
| 2013/0148609 A1 | 6/2013 | Ram et al. |

OTHER PUBLICATIONS

Business Wire. "Meru Networks Delivers Industry's Only Zero-Loss Mobility Across WLAN Access Points and IP Subnets." Jun. 21, 2004, pp. 1-2.

Chen et al. "A Seamless Handoff Mechanism for OHCP-Based IEEE 802.11 WLANs." IEEE Communications Letters, Aug. 2007, pp. 665-667, vol. 1, No. 8.

Cheung et al. "Network Configurations for Seamless Support of COMA Soft Handoffs Between Cell Clusters." IEEE Journal on Selected Areas in Communications, Sep. 1997, pp. 1276-1278, vol. 15, No. 7.

Chou et al. "Intelligent Agent Over WLAN With Seamless Handover and Load Balancing." 2006 International Conference on Communication Technology, Nov. 27-Nov. 30, 2006, pp. 1-7, IEEE. (Abstract).

Chui et al. "An Access Point Coordination System for Improved VoIP/WLAN Handover Performance." IEEE, 2006, pp. 501-505.

Fan et al. "Managing Heterogeneous Access Networks." 32nd IEEE Conference on Local Computer Networks, 2007, pp. 651-658, IEEE 2007, pp. 651-658.

Finneran. "Can WLAN switches support voice? Today's controllers offer key security and QoS capabilities, but as always, the devil's in the details." Business Communications Review, Oct. 2006, pp. 42-47.

Huang et al. "Incorporating AP Selection and Call Admission Control for Seamless Handoff Procedure." Proceedings of the International Conference on Computer and Communication Engineering 2008, pp. 823-826.

Huang et al. "SAP: Seamless Authentication Protocol for Vertical Handoff in Heterogeneous Wireless Networks." Third International Conference in Heterogeneous Wired/Wireless Networks, Aug. 7-9, 2006, pp. 1-10, Waterloo, ON, CA.

Hur et al. "A Distributed-Request-Based Diffsery CAC for Seamless Fast-Handoff in Mobile Internet." J. Sole-Pareta et al. (Eds.): Q of IS 2004: International Workshop on Quality of Future Internet Services, LNCS 3266, pp. 184-193, 2004.

(56) References Cited

OTHER PUBLICATIONS

IEEE Std 802. 11-1997 Information Technology—telecommunications and Information exchange between systems—Local and Metropolitan Area Networks—specific Requirements—part 11: Wireless Lan Medium Access Control (MAC) and Physical Layer (PHY) Specifications, IEEE Std 802.11-1997, vol., no., pp. i-445, Nov. 18, 1997.
IEEE. "Part 11: Wireless LAN Medium Access Control (MAC) and Physical Layer (PHY) specifications." IEEE Std. 802.11, 1999 Edition (R2003), 2003, vol. no. pp. i-513.
Jang et al. "Mobility Support Algorithm Based on Wireless 802.11 b LAN for Fast Handover." 5th International Conference, PDCAT 2004, Dec. 8-10, 2004, pp. 715-718, Springer Verlag. (Abstract).
Zhou et al. "A Seamless Handoff Scheme for Mobile IP." 2006 IEEE 63rd Vehicular Technology Conference, VTC 2006—Spring, May 7-Jul. 10, 2006, pp. 927-931, IEEE. (Abstract).
Kist. "Instant Handoffs for Wireless Infrastructure Meshed Networks." Proceedings of the 2008 Australasian Telecommunication Networks and Applications Conference, 2008, pp. 288-293.
Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.
LV. "Intelligent Seamless Vertical Handoff Algorithm for the Next Generation Wireless Networks." Mobilware '08, Feb. 12-15, 2008, pp. 1-10, Innsbruck, Austria.
Mannion. "Foundry Networks enters WLAN management fray—Bets on integration with wired infrastructure, market timing to take on Cisco." Electronic Engineering Times, Sep. 8, 2003, p. 32, No. 1286.
Manodham. "A Seamless Handoff Scheme with New AP Module for Wireless LANs Support VoIP." 2006. International Symposium on Applications and the Internet, SAINT 2006, Jan. 23-27, 2006, pp. 253-258, IEEE. (Abstract).
Manodham et al. "A Seamless Handoff Scheme with New AP Module for Wireless LANs support VoIP." Proceedings of the 2005 Symposium on Applications and the Internet, 2006, pp. 1-6, IEEE.
Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 67, Reed Business Information.
Murray et al. "Intelligent Access and Mobility Management in Heterogeneous Wireless Networks Using Policy." ACM First International Workshop on Information and Communication Technologies, 2003, pp. 181-186.
Rist et al. "Wireless LANs—Look, MA . . . No Wires—Wireless networking products prove they are finally ready for prime time." Internetweek, Mar. 20, 2000, p. 41, No. 805, CMP Media, Inc.
Sattari et al. "Seamless Handover Between WLAN and UMTS." 2004 IEEE 59th Vehicular Technology Conference, VTC2004—Spring: Towards a Global Wireless World, May 17-19, 2004, pp. 3035-3038, IEEE. (Abstract).
Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).
Wei et al. "Seamless Handoff Support in Wireless Mesh Networks." 2006, pp. 1-8, IEEE.
Xhafa et al. "Seamless Handover in Building Using HVAC Ducts: A New System Architecture." IEEE Global Telecommunications Conference GLOBECOM'03, Dec. 1-5, 2003, pp. 3093-3097, IEEE. (Abstract).
Yaakob et al. "An Integration of Mobile Motion Prediction with Dedicated Solicitation Message for Seamless Handoff Provisioning in High Speed Wireless Environment." 2008 International Conference on Electronic Design, Dec. 1-3, 2008, Pernang, Malaysia, pp. 1-5.
Yamagata et al. "Seamless Handover for Hotspot Network Using Adaptive Flow Control Method." 2005 Asia-Pacific Conference on Communications, Oct. 3-5, 2005, pp. 502-506, IEEE. (Abstract).
Zhou et al. A Seamless Handoff Scheme for Mobile IP. IEEE Vehicular Technology Conference, 2006, pp. 927-931, vol. 2.

\* cited by examiner

OPTIMIZING QUALITY OF SERVICE IN WIRELESS NETWORKS

CROSS REFERENCE TO RELATED PROVISIONAL APPLICATION

This application claims priority from Provisional Application No. 61/290,830, entitled "Optimizing Quality of Service in Wireless Networks," filed Dec. 29, 2009, in the name of the same inventor. The Provisional Application is hereby incorporated by reference as if fully set forth herein.

BACKGROUND

Wireless devices provide for various communication modes such as voice, video, data, and possibly otherwise. The operation of the communications network determines how well these modes function. Certain modes suffer more than others from network problems such as latency and missing data. For a first example and without limitation, voice communication over a network might become degraded if the network operates slowly enough that one user can hear a time delay while talking to another. For a second example and without limitation, with digital communication of documents, latency might not be of particularly strong importance, but data communication is considered degraded if any data goes missing. In wireless communication systems, problems can be more acute when wireless stations transition between different access points, or when they are subject to one or more forms of interference. Interference might include natural signal losses when moving away from an access point, interference from access points operating on the same frequency, and other forms.

Messages sent in networks often have a QoS (quality of service) associated with them. In use on the Internet, there are typically at least 4 classes of QoS: VO (voice), VI (video), BE (best efforts), and BG (background), from highest priority to lowest priority. Routing standards often provide that each AP (access point) waits an amount of time after the communication channel becomes clear, then begins transmitting if the communication channel has not already been seized by another AP. Determining an optimal amount of time to wait so as to provide proper QoS, while losing minimal bandwidth to unnecessary waiting, might involve selecting as many as 32 separate parameters for each AP (4 classes of QoS times 4 parameters, times 2 because uplink and downlink parameters might be different). Each level of QoS has a distinct set of characteristics associated with traffic usually associated with that QoS.

One known problem is that two distinct classes of messages, each with a distinct QoS, might interfere with each other and cause degradation of one or both. For example and without limitation, as noted above, voice messages generally presuppose low latency, while data messages generally presuppose low bit error rates. Known methods of approaching this problem include separating each distinct class of messages, each associated with a distinct QoS, into a separate queue for reception or transmission. While this method generally has the feature of separate treatment of distinct classes of messages, it has the drawback that a $1^{st}$ class of messages (e.g., voice) might be subject to degradation due to a prevalence of a $2^{nd}$ class of messages (e.g., data), as the latter type of messages might be significantly longer, and thus take more time even if assigned relatively lower priority.

SUMMARY OF THE DESCRIPTION

This description includes techniques, including methods, physical articles, and systems, which provide a substantially optimal waiting time for each AP, e.g., providing proper QoS while losing minimal communication bandwidth.

In an aspect of the invention, such techniques include setting parameters for each level of QoS in response to a measure of the degree of contention for that level of QoS, and in response to a measure of the degree of contention for those levels of QoS with higher priority. This has the effect that changes in contention at each level of QoS affect the AP's waiting time parameters, not only for that level of QoS, but also for levels of QoS with lower priority.

In an aspect of the invention, such techniques include setting waiting time parameters in response to a stochastic model of contention at each level of QoS. Such techniques are operable in a system in which message units are received at a node in a wireless communication network, such as an access point, determining a QoS appropriate to those message units, and processing message units at the node according to message unit type. Operational parameters, including but not limited to, contention window time, AIFS time, and back-off value(s), might be set to provide for processing of message units in accordance with message QoS, with the effect that the message units transit the node in a substantially optimal process for the selected QoS.

REAL-WORLD NATURE

Figure 1:
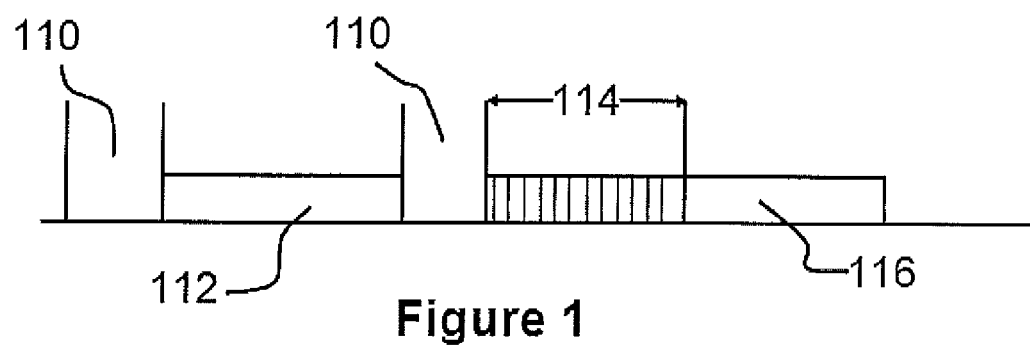
FIG. 1 shows a conceptual diagram of timing in a communication system.

The invention includes techniques, including methods, physical articles, and systems, that receive real-world information dictated by real-world conditions (not mere inputs to a problem-solving technique). The techniques provided by the invention are transformative of the information received, at least in the sense that incoming data is reordered and allocated to particular times and priorities. This has the effect that a $1^{st}$ type of information (e.g., incoming message units) is transformed into a $2^{nd}$ type of information (e.g., relative priority of outgoing message units).

The invention includes techniques that are tied to a particular machine, at least in the sense that allocation of time and bandwidth is performed in a communication system. While this description is primarily directed to that portion of the invention in which an AP plays a prominent role, this description also shows that an AP alone (i.e., without appropriate instructions) be sufficient to perform methods, or comprise systems, within the scope and spirit of the invention.

DESCRIPTION

Generality of the Description

This application should be read in the most general possible form. This includes, without limitation, the following:

References to specific techniques include alternative and more general techniques, especially when discussing aspects of the invention, or how the invention might be made or used.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

The invention is not in any way limited to the specifics of any particular examples disclosed herein. Many other variations are possible which remain within the content, scope and spirit of the invention, and these variations would become clear to those skilled in the art after perusal of this application.

DEFINITIONS AND NOTATIONS

The following definitions and notations are exemplary, and not intended to be limiting in any way:

The phrases "access point", the term "AP", and the like, generally refer to devices capable of wireless communication with wireless devices and capable of either wired or wireless communication with other devices. In preferred embodiments, AP's communicate with external devices using a L2/L3 network. However, in the context of the invention, there is no particular requirement that AP's have an actual wired communication link; AP's might communicate entirely wirelessly.

The phrases "incoming message", "message packet", "message unit", "received frame", and the like, generally refer to a message unit (for example and without limitation, a message packet or message frame) sent by a wireless device or wireless station to an AP. For example and without limitation, these phrases might refer to a (multicast or unicast) frame sent by a wireless station to an AP using an IEEE 802.11 wireless communication standard.

The words "latency", and the like, generally refer to the time interval between when a network station seeks access to a transmission channel and when access is granted or received. Latency may also be characterized when used in a bridge or router as the amount of time elapsed between receiving and retransmitting a message packet.

The phrases "message unit", and the like, generally refer to any individually or separately transmittable portion of a message, including without limitation, a data flow, a message frame, a message packet, or otherwise. For example and without limitation, a message unit might include an IEEE 802.11 standard message frame, but in the context of the invention, there is no particular reason why there should be any such limitation.

The phrases "mobile station", "wireless device", "wireless station", and the like, generally refer to devices capable of wireless communication with AP's. For example and without limitation, wireless devices might implement a wireless communication standard such as an IEEE 802.11 standard. However, in the context of the invention, there is no particular requirement (1) that this particular communication standard is used, e.g., the wireless communication might be conducted according to a standard other than 802.11, or even according to a an IEEE standard entirely, or (2) that all wireless devices each use the same standard or even use intercompatible communication standards.

The phrases "outgoing message", "transmit frame", and the like, generally refer to a message unit (for example and without limitation, a message packet or message frame) being sent to a wireless device or wireless station from an AP. For example and without limitation, these phrases might refer to a (multicast or unicast) frame sent by an access point to a wireless device using an IEEE 802.11 wireless communication standard.

The phrases "quality of service" (QoS), and the like, generally refer to a measure of the level of service delivered to a network user, possibly collectively determined over a set of messages or message units. QoS may be characterized by several basic performance criteria, including but not limited to availability (e.g. relatively low downtime), error performance, response time, throughput, and lost calls or transmissions due to network congestion.

The phrases "wireless communication", and the like, generally refer to any form of communication not requiring a physical matter coupling of substantial duration, e.g., might generally refer to radio frequency or other electromagnetic communication. For example and without limitation, these phrases might refer to use of an IEEE 802.11 standard. However, in the context of the invention, there is no particular requirement that wireless communication or a communication network must necessarily (1) use radio spectrum, (2) use electromagnetic communication, or even (3) be entirely confined to untethered communication.

After reading this application, those skilled in the art would recognize that these definitions and notations would be applicable to techniques, methods, physical elements, and systems—not currently known, or not currently known to be applicable by the techniques described herein—including extensions thereof that would be inferred by those skilled in the art after reading this application, even if not obvious to those of ordinary skill in the art before reading this application.

Figures and Text

Where described as shown in a figure, an element might include
  other items shown in the figure in addition to, or operating in combination or conjunction with, that particular element (or that particular element in combination or conjunction with other elements, whether shown or not shown in the figure, and whether described or not described with respect to the figure).
  other items not shown in the figure, but whose inclusion would be known to those skilled in the art, or which would be known after reasonable investigation, without further invention or undue experimentation.
  subparts of that element, whether shown or not shown in the figure, which might be convenient for operation of the element, but which are not necessarily required in the described context, or which might be necessary for operation of the element in the described context, but which are not necessary for description at a level understandable to those skilled in the art.

FIG. 1

FIG. 1 shows a conceptual diagram of timing in a communication system.

In the figure, a horizontal coordinate generally indicates time, while a vertical coordinate generally indicates events that are scheduled for selected times. The figure shows an automatic interframe spacing (AIFS) time 110, a time when the communication medium is occupied 112, and a contention window time 114.

After each time when the communication medium is occupied 112, each node in a communication system waits at least a minimum AIFS time before attempting to transmit a message unit. The minimum AIFS time is responsive to the QoS associated with the message unit. Higher-priority message units (i.e., those for which lesser latency is desired) are assigned a relatively lower AIFS time. This has the effect that those higher-priority message units, if available to be sent after a time duration when the communication medium is occupied 112, will be sent first.

After the AIFS time is done, the communication medium is considered open for seizing by the first moving node in the communication system. During the contention time 114, each node selects a random amount of time to wait (for example and without limitation, a value between 0 and $2^n$, where n is a waiting-time parameter) before attempting to seize the communication medium. If two nodes have equal or similar waiting-time parameters, this has the effect that they will share the communication medium approximately equally. If a node A has a relatively smaller waiting-time parameter than a node B, this has the effect that node A will seize the communication medium relatively more frequently than node B, i.e., with relatively higher priority. This technique is sometimes referred to as a DCF (distributed coordination function), or alternatively, as a stochastic model of contention.

If by chance a node A attempts to seize the communication medium at approximately the same time as a node B, this has the effect that each node will notice a collision. Each node then waits another random amount of time, sometimes referred to as a "back-off time", generally selected to be a multiple of the original waiting-time parameter. For example and without limitation, each of node A and node B might select a back-off time that is double the waiting-time parameter. If a second collision occurs, both node A and node B again wait a second-order back-off time, for example and without limitation, twice the first back-off time, until one of node A or node B is successful at seizing the communication medium.

If a node A finds the communication medium is busy when it would otherwise attempt to seize the communication medium, the node waits for the next opportunity. To provide fairness, a back-off timer is used. Each node selects a random waiting time within the range of the contention window. If the node doesn't get access to the medium in the first cycle, it stops the back-off timer and waits for the medium to be idle for the AIFS time. The timer is then restarted. The node will not choose another back-off time, but will continue counting down thus giving the deferred nodes an advantage over new joining nodes. When the communication medium is clear, traffic from the station is transmitted 116.

FIG. 2

Figure 2:
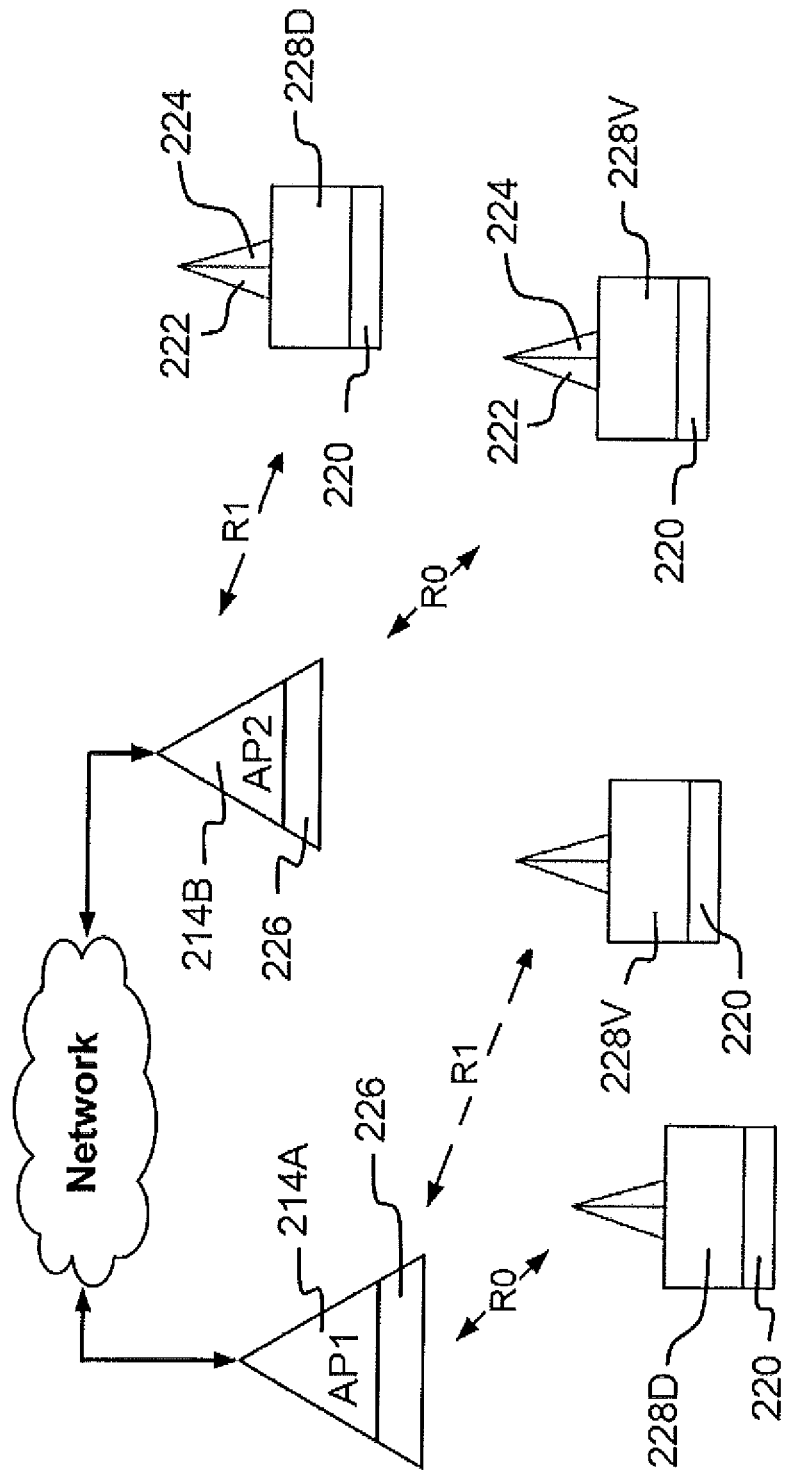
FIG. 2 shows a conceptual diagram of a communication system.

FIG. 2 shows a conceptual diagram of a communication system.

Each AP 214A and 214B represents a single wireless system operating in its own sphere and is connected to a communication system, for example and without limitation, a computer communication network, such as the Internet. AP's 214A and 214B provide wireless communications through links to one or more wireless stations 218 (sometimes called mobile stations). For might use voice communications, while wireless stations 218D might use digital communications, while other wireless stations might use other communications modes. Each wireless device 218 is connected to one or more of the AP's 214A and 214B, according to the protocol used by the wireless device, for example IEEE standard 802.11b, IEEE standard 802.11g, IEEE standard 802.11n, or IEEE standard 802.11j. Distinct protocols might have different speeds or data rates for transmitting and receiving data between the wireless devices 218 and the access point 214 ($R_o$-$R_n$).

Each wireless device 218 includes elements shown in the figure, including at least a device control circuit 220, a transmitter 222, and a receiver 224. For example and without limitation, the device control circuit 220 includes a computing device preprogrammed to implement one or more of the IEEE 802.11a, IEEE 802.11b, IEEE 802.11g, IEEE 802.11n, or IEEE 802.11j protocols, and includes one or more radios. For example and without limitation, a wireless device might be a telephone or mobile computer configured to operate in a wireless communication system. A wireless device might include programmable memory, data memory, and optionally mass storage, such as, for example and without limitation, a mobile computer programmable to discover and operate in conjunction with a wireless communication system. However, in the context of the invention, there is no particular requirement for any such limitation.

Access Points

Each AP 214A and 214B includes elements shown in the figure, including at least an AP control circuit 226 and a transceiver. The AP control circuit 226 includes a computing device, such as a processor, program and data memory, and optionally mass storage. In cases in which the AP control circuit 226 includes a programmable computing device, it might operate under control of software, optionally distinguished as operating system software and application software.

Parameters Adjustment

QoS classes described herein include voice (VO), video (VI), best efforts (BE), background (BG), and possibly other QoS classes. Operational parameters affecting a DCF (as described above) might include a maximum contention window time, an AIFS (automatic inter-frame spacing) a random back-off time, and possibly other parameters. AP's in a wireless communication system engage in setting parameters for each level of QoS in response to a measure of the degree of contention for that level of QoS and for those levels of QoS with higher priority. Data flows are processed in separate queues according to QoS indication and in response to that indication, appropriate operational parameters are set. This processing affects not only the parameters for the data flow under consideration but also for levels of QoS with lower priority. Parameters are also set based on the number of users for each QoS level. Data flows may operate bi-directionally, with the effect that operational parameters may be established for each device in response to its QoS and in response to its location in the system.

Voice Parameters

Once all traffic on the channel has stopped, each AP has an opportunity to send a message. VO (voice) QoS messages have highest priority, so for each particular AP, if there are any, it sends those messages first. Current IEEE 802.11 standards provide that there is a time delay after all traffic has stopped (AIFS) of at least 10 microseconds. After that 10 microsecond period, the AP has the choice of waiting 1 or more time slots (each a designated amount of time, such as some number of microseconds) before sending a message. This has the effect that if the AP waits, another AP with a higher-priority message will be able to send its message first. Current IEEE 802.11 standards provide that the AP stochastically determines a further time delay (as described above), so that multiple APs can avoid collisions if more than one of them attempts to each send a message substantially concurrently (e.g., within 1 time slot). If two APs each send a message substantially concurrently, those messages will collide, with the effect that recipients will not be able to determine what was sent. In case of a collision, each AP whose message collided conducts a "back-off" for a stochastically determined amount of time. The back-off parameter is sometimes referred to as $[C_w]$, which refers to an exponentially growing amount of time for back-off after each collision. In effect the AP waits a random (or pseudorandom) amount of time between 0 and $[2^w-1]$ time slots before sending its message. Each AP that wants to send a message over a channel must contend with other APs on the channel. In a system where there are [m] contenders for sending messages, the average number of contenders for each time slot will asymptotically approach $[2-1/m]$. In response to this, an "ideal" back-off would be $[2n+k]$ time slots, where $[n=2-1/m]$ where [n] represents a measure of the instantaneous number of contenders, and [k] represents a measure of the size of a typical message packet. Voice message packets are typically 64 Kbytes, and there are typically 50 such packets per second. It appears superior to set the back-off parameter to account for a number of contenders at about 1 standard deviation above average. By way of example, the AP sets its $[C_w]$ to $[an+b]$, where [a] equals about 0.2 (as a conservative choice), and [b] equals a parameter $[C_{w\ min}]$. In one such embodiment, $[C_{w\ min}]$ equals 2, (i.e., $[2^2=4]$) time slots. The AP sets its parameters in response to whether there is any substantial VO (voice) traffic recently. If there is no such voice traffic, the AP sets $[C_{w\ min}=0]$, $[C_{w\ max}=0]$, and $[AIFS=0]$. If there is such voice traffic, the AP sets $[C_{w\ min}=0.2n+2]$, $[C_{w\ max}=C_{w\ min}+2]$, and $[AIFS=1]$. With AIFS equal to 1 time slot, other APs with voice traffic can assure that they will be first by choosing 0 time slots of delay. These parameters might be distributed to each device associated with that traffic. Further, in the event of a hand-off of a wireless device from a first AP to a second AP, the most effective parameters might also be handed off along with the device, either directly, or indirectly through the use of an intermediary controller.

Video Parameters

Video operation parameters are set and processed at a lower priority that voice operation parameters. The AP sets its parameters for video traffic in response to whether there is any recent video and/or voice traffic. If there is no video traffic, the AP sets $[C_{w\ min}=0]$, $[C_{w\ max}=0]$, and $[AIFS=0]$. If there is substantial video traffic, the AP sets $[AIFS_{VI}=AIFS_{VO}+C_{w\ min\ VO}]$, $[C_{w\ min\ VO}=0.4n+3]$, and $[C_{w\ max\ VO}=C_{w\ min\ VO}+2]$. In effect creating parameters in response to parameters determined for voice traffic.

Best Effort Parameters

Once voice and video parameters are set, the AP sets its parameters for best efforts traffic if there has been any substantial recent best efforts mode traffic. If there is no such best efforts traffic, the AP sets $[AIFS_{BE}=0]$, $[C_{w\ min\ BE}=0]$, and $[C_{w\ max\ BE}=0]$. If there is such best efforts traffic, the AP sets $[AIFS_{BE}=AIFS_{VI}+C_{w\ min\ VI}]$, $[C_{w\ min\ BE}=\min(0.5n+1,10)]$, and $[C_{w\ max\ BE}=C_{w\ min\ BE}+2]$.

Background Parameters

With best efforts parameters set, the AP sets its parameters for background traffic which is usually lower-priority data transfers. The AP sets $[C_{w\ min\ BG}]$, $[C_{w\ max\ BG}]$, and $[AIFS_{BG}]$ to values which are relatively large compared to corresponding parameters for other, lower-priority traffic. For example, the parameter values may be set in response to the parameters for higher priority traffic.

FIG. 3

Figure 3:
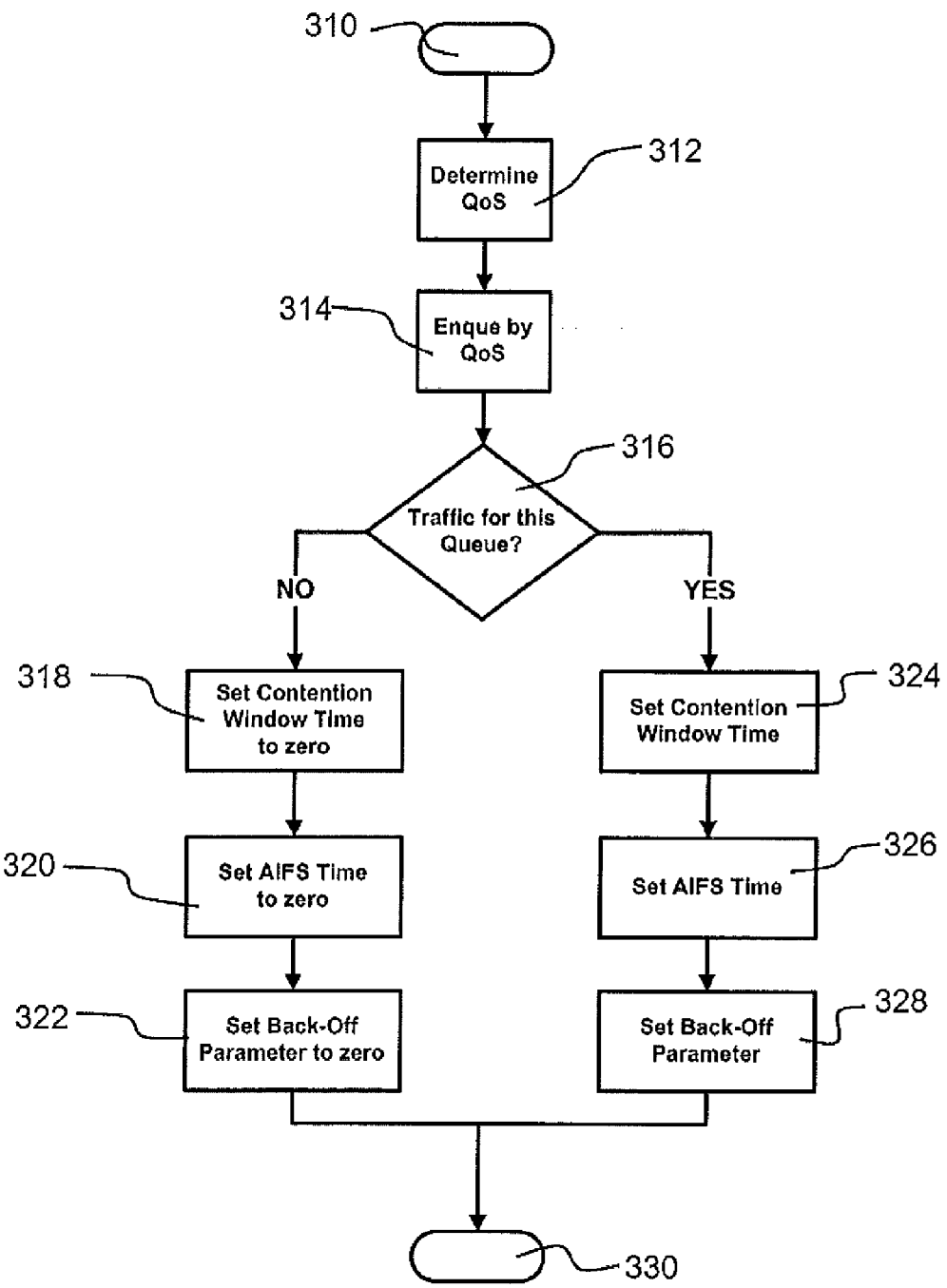
FIG. 3 shows a conceptual diagram of a method.

FIG. 3 shows a conceptual diagram of a method. A method 300 includes flow labels and method steps as shown in the FIG. 3.

A flow label 310 indicates a beginning of a method 300. For example and without limitation, the method 300 might begin with reception of a data flow.

At a step 312, the method 300 determines a QoS (quality of service). In cases in which the method 300 operates on data flows, the QoS is associated with one or more data flows. For example and without limitation, QoS might include "VO" (voice), "VI" (video), "BE" (best efforts) or "BG" (background). Other QoS parameters are also possible. In the context of the invention, there is no particular requirement for any given set of QoS parameters.

At a step 314, the method 300 queues data flows (or individual messages, or individual message units) in response to their associated QoS. This has the effect of allowing separate processing for distinct QoS.

At a step 316, the method 300 polls each queue, to determine whether there is traffic volume for that associated QoS. For a first example and without limitation, the method 300 might transmit a message unit in response to any queue that is not empty. For a second example and without limitation, the method 300 might transmit a message unit in response to any queue that has sufficient queues data flows, messages, or message units, that the method 300 determines that transmitting a message unit is justified. While there is no particular distinction made herein between transmit criteria for distinct queues, in the context of the invention, there is no particular reason for any such limitation. For example and without limitation, the method 300 might determine that it is justified in transmitting a message unit in response to differing criteria for distinct queues.

If, at the step 316, a queue associated with a particular QoS does *not* have sufficient traffic volume to justify transmitting a message unit, selected parameters are set to so indicate. For example and without limitation, At a step 318, a contention window time for that queue is set to zero.

At a step 320, an AIFS time for that queue is set to zero.

At a step 322, a back-off parameter for that queue is set to zero.

If, at the step 316, a queue associated with a particular QoS *does* have sufficient traffic volume to justify transmitting a message unit, selected parameters are set to so indicate. For example and without limitation, At a step 324, a contention window time for that queue is set (as described above).

At a step 326, an AIFS time for that queue is set (as described above).

At a step 328, a back-off parameter for that queue is set (as described above).

At a flow label 330, the method 300 is completed. The method 300 might be repeated indefinitely so long as the device performing the method 300 (e.g., an AP or other node) is operational.

As seen above with respect to the method 300, the AP (or other node) processes data flows, messages, and message units in response to a type of traffic (thus, a QoS) associated with that message traffic. For example and without limitation, each QoS level has its parameters dynamically and independently set for its particular type of traffic (as described above).

This has the effect of providing for substantially optimal handling for each associated QoS, e.g., by varying parameters of a distributed coordination function associated with that particular QoS (as described above). For example and without limitation, services where delays substantially degrade performance can be processed to reduce delays, while services where loss of data is more critical than latency can be serviced with a lower priority but with a greater attention to guaranteed delivery of data. For example and without limitation, such techniques include setting parameters for each level of QoS in response to a measure of the degree of contention for that level of QoS, and in response to a measure of the degree of contention for other levels of QoS with higher priority (as described above). This has the effect that changes in contention at each level of QoS affect the waiting time parameters, not only for that level of QoS, but also for levels of QoS with lower priority (as described above).

For example and without limitation, such techniques include setting waiting time parameters in response to a stochastic model of contention at each level of QoS (as described above). Such techniques might be operable in a system in which message units are received at a node in a wireless communication network, such as an AP (as described above).

ALTERNATIVE EMBODIMENTS

The invention has applicability and generality to other aspects of wireless communication. It is not limited to wireless communication based upon 802.11 standards, nor is it limited to any particular IEEE standard, or even to any particular communication standard. One having skill in the art will recognize that the systems and methods disclosed herein may be effectuated using other techniques. For example and without limitation, the transmission time may be provided by the physical layer or data link layer to a higher level for determining the transmission time, or values other than the transmission time.

The invention claimed is:

1. A computer-implemented method in an access point for accessing a medium for data transmission in a wireless communication system, the method comprising the steps of:
   determining a QoS (quality of service) type for traffic received at the access point, wherein more than one type of traffic is determined;
   separately queuing the traffic at the access point responsive to the QoS type of traffic for separate processing;
   measuring an amount of each QoS type of external traffic;
   determining a stochastic model of contention for the medium comprising one or more contention parameters responsive to the measurements for each type of external traffic and a quality of service associated with each type of traffic, wherein:
   responsive to the amount of each QoS type of external traffic being below a preconfigured threshold, setting a Cw (contention window) back-off parameter and an AIFS (automatic interframe spacing) parameter to substantially zero to increase access to the medium, and
   responsive to the amount of each QoS type of external traffic being at or above a preconfigured threshold, setting a Cw back-off parameter and an AIFS time that increases based on a larger amount of recent traffic for each QoS type to reduce access to the medium; and
   contending for access to the medium separately for each type of traffic in response to the one or more contention parameters.

2. The method of claim 1, further comprising:
   determining a number of VoIP (Voice over Internet Protocol) calls from the measurements for at least one of the types of traffic,
   wherein determining the one or more contention parameters is further responsive to the number of voice calls at the at least one external access point and the at least one wireless device.

3. The method of claim 1, wherein determining the one or more contention parameters is directed by a control element with, communication among, and management responsibility for, the access point and the at least one external access point.

4. The method of claim 1, wherein the one or more contention parameter are based at least in part on a type of node being an access point rather than a station.

5. The method of claim 1, wherein the one or more contention parameters comprise one or more of: a minimum contention window, and a maximum contention window.

6. The method of claim 1, wherein the QoS type associated with the type of traffic comprises one or more of: VO (voice), VI (video), BE (best efforts), and BK (background).

7. A non-transitory computer-readable medium storing instructions that, when executed by a processor in an access point for accessing a medium for data transmission in a wireless communication system, perform a method comprising the steps of:
   determining a QoS (quality of service) type for traffic received at the access point, wherein more than one type of traffic is determined;
   separately queuing the traffic at the access point responsive to the QoS type of traffic for separate processing;
   measuring an amount of each QoS type of external traffic;
   determining a stochastic model of contention for the medium comprising one or more contention parameters responsive to the measurements for each type of external traffic and a quality of service associated with each type of traffic, wherein:
   responsive to the amount of each QoS type of external traffic being below a preconfigured threshold, setting a Cw (contention window) back-off parameter and an AIFS (automatic interframe spacing) parameter to substantially zero to increase access to the medium, and
   responsive to the amount of each QoS type of external traffic being at or above a preconfigured threshold, setting a Cw back-off parameter and an AIFS time that increases based on a larger amount of recent traffic for each QoS type to reduce access to the medium; and
   contending for access to the medium separately for each type of traffic in response to the one or more contention parameters.

8. An access point in a wireless communication system, the access point comprising:
   a first module to determine a QoS (quality of service) type for traffic received at the access point, wherein more than one type of traffic is determined;
   a storage device to separately queue the traffic at the access point responsive to the QoS type of traffic for separate processing;
   a measurement module to measure an amount of each QoS type of external traffic;
   a contention module to determine a stochastic model of contention for the medium comprising one or more contention parameters responsive to the measurements for each type of external traffic and a quality of service associated with each type of traffic, wherein:
   responsive to the amount of each QoS type of external traffic being below a preconfigured threshold, setting a Cw (contention window) back-off parameter and an AIFS (automatic interframe spacing) parameter to substantially zero to increase access to the medium, and responsive to the amount of each QoS type of external traffic being at or above a preconfigured threshold, setting a Cw back-off parameter and an AIFS time that increases based on a larger amount of recent traffic for each QoS type to reduce access to the medium, wherein the contention module contends for access to the medium separately for each type of traffic in response to the one or more contention parameters.

* * * * *